Sept. 5, 1950        P. J. MITCHELL, JR        2,521,242

PERMANENTLY PUMPABLE OLEAGINOUS SUSPENSION

Filed Nov. 6, 1947        4 Sheets-Sheet 1

ALPHA 4.14 Å

FIG. 1ª

BETA PRIME 4.18 Å
3.78 Å

BETA

4.61 Å
3.84 Å
3.68 Å

Inventor

Paul J. Mitchell, Jr.

By Watson, Cole, Grindle & W

Attor

Patented Sept. 5, 1950

2,521,242

UNITED STATES PATENT OFFICE 2,521,242

PERMANENTLY PUMPABLE OLEAGINOUS SUSPENSION

Paul J. Mitchell, Jr., Sunnyside, Ga., assignor, by mesne assignments, to The Procter & Gamble Company, Cincinnati, Ohio, a corporation of Ohio Application November 6, 1947, Serial No. 784,358

11 Claims. (Cl. 99—118)

The present invention relates to oleaginous compositions having substantially permanent fluid to pasty consistency over the normal range of room temperature, and more particularly to suspensions of a high proportion of solid triglyceride in liquid fatty acid esters of high molecular weight, which suspensions are characterized by pumpable fluid consistency over the normal range of room temperature.

It is common practice to convert liquid glyceride oils to non-fluid plastic shortening products by incorporating or forming therein relatively small amounts, such as 10 to 15 per cent, of normally solid saturated glycerides.

Such compositions, as commonly prepared by blending in molten condition and then cooling to room temperature either by spontaneous cooling accompanied by agitation, or by rapid chilling on a refrigerated steel roll followed by beating until smooth in consistency, rapidly set up to a non-pumpable solid to semi-solid state and remain in this condition when kept at temperatures below about 100° F. If prepared by spontaneous cooling from molten condition without agitation such compositions may acquire a soupy or grainy semi-liquid consistency in which the crystals of solid fat form comparatively large, loose clusters and tend to settle to the bottom, leaving clear oil at the top.

If in such compositions, prepared in any of these ways, the content of solid saturated triglycerides is substantially increased—say to 25 per cent or above of the whole—the resulting products not only are non-pumpable but also may even be rigid solids at room temperature.

For some purposes there are advantages in providing a fatty composition, comprising a slurry of a high proportion of solid fat particles in liquid fatty esters, which retains a liquid to semi-liquid consistency so that it may be poured or pumped, and of such a nature that the solid fat particles remain uniformly distributed throughout the mass of liquid, without objectionable settling out. Thus for use in the stabilization of the consistency of peanut butter, it is desirable to prepare a pumpable composition of this character in which as much as half, or even more than half, of the fatty material is in solid condition.

It is an object of the present invention to provide suspensions of a relatively high proportion of solid triglyceride in liquid fatty acid ester, which suspensions are characterized by having a high degree of uniformity in composition as regards the distribution of solid in liquid, by having pumpable consistency as prepared, and by retaining pumpable consistency substantially indefinitely when kept within the normal range of room temperature.

Other objects will become apparent from the description of the invention which follows.

I have discovered that oleaginous compositions having the objective characteristics above set forth can be prepared and it has been found that in these the solid glycerides in the solid-liquid suspensions exist in the beta crystalline form instead of in the alpha or beta-prime crystalline form as more fully hereinafter described. Such suspensions containing as much as 60 per cent solid triglyceride in liquid fatty acid ester and possessing substantially permanent pumpable consistency throughout the range of temperature from about 70 to 100° F. may be realized. Stability against marked change in consistency and pumpability within the range of temperatures and for the length of time ordinarily encountered in storage and transportation is commercially highly desirable in the case of various oleaginous compositions hereinafter set forth.

The invention will be more fully understood from the following description taken in conjunction with the accompanying drawings wherein.

It is known that glyceride fats may be crystallized in any one of a plurality of forms, depending on the temperature and speed at which crystallization is permitted to take place. In this connection the reader is referred to Ferguson and Lutton, Chem. Rev., 29, 355 (1941) and Lutton, J. A. C. S., 67, 524 (1945) for a review of related details, especially those concerning means for identification of the various crystalline forms and their physical characteristics. Although these references deal principally with substantially pure trisaturated glycerides, the information given can be used as a guide in determining pertient data encountered in dealing not only with solid triglycerides produced commercially, as by hydrogenation of natural facts and oils, but also with suspensions of such solid triglycerides in liquid fatty acid esters.

It will be apparent from the above mentioned articles that the identifying terminology for the crystalline forms of fats may vary depending on the investigator, and in order that there may be no misunderstanding regarding the meaning of the terms herein used, the following definitions of the crystalline forms are submitted.

Figure 1A:
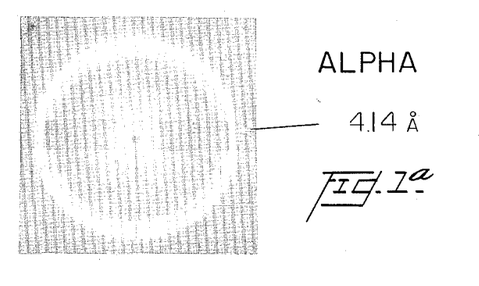
Figure 1a is an X-ray diffraction pattern of a triglyceride in alpha crystalline form.

The alpha crystalline form is the least stable, lowest melting and least dense of the forms. The X-ray diffraction pattern for this crystalline form is shown in Figure 1a and reveals a single short spacing at 4.14 Angstrom units, indicating hexagonal arrangement of the long chain axes in the crystals. The macroscopic appearance of this form is translucent.

Figure 1B:
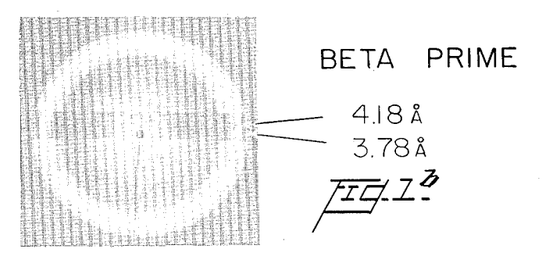
Figure 1b is an X-ray diffraction pattern of a triglyceride in beta-prime crystalline form.

The beta-prime form is usually intermediate between the alpha and the beta form (the latter described below) in relative stability, melting point and density. As indicated in Figure 1b, it is in general characterized by two short spacings in the X-ray diffraction pattern, one at 4.18 Angstrom units and the other at 3.78 Angstrom units. The macroscopic appearance of the beta prime crystalline form is more opaque than alpha but less opaque than beta. In outward physical form, the beta-prime crystal has a very high length to breadth ratio and thus is capable of immobilizing large quantities of liquid when interlaced with other beta-prime crystals.

Figure 1C:
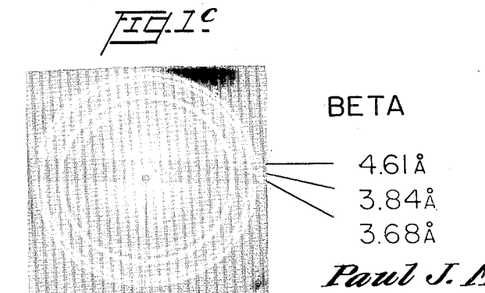
Figure 1c is an X-ray diffraction pattern of a triglyceride in beta crystalline form.

The beta form is the most stable, most dense, highest melting of the polymorphic forms for any hard fats. Figure 1c shows the X-ray diffraction pattern which is characterized by prominent multiple short spacings at 4.61, 3.84 and 3.68 Angstrom units. A less prominent short spacing characteristic of the beta crystalline form also exists at 5.3 Angstrom units, but this is not designated in Figure 1c. The macroscopic appearance of the beta crystalline form is opaque, very white, and sometimes powdery. In outward physical form, the beta crystal has a relatively low length to breadth ratio and appears less capable of immobilizing liquids.

As indicated above and as set forth in the reference articles mentioned, critical control must be exercised in order that a solid fat may have a desired crystalline form. Although the beta form is usually the most stable, solid triglycerides do not necessarily exist in this form for they may have solidified under conditions which do not permit the formation of beta crystals. Many normally occurring solid triglycerides, both alone and in admixture or suspension with liquid triglycerides, are constituted of a plurality of crystalline forms, the beta-prime form frequently predominating. Mixtures containing as little as about 25 per cent, or more, of solid fats in such beta-prime crystalline form and processed under the most favorable conditions for maximum fluidity of the suspension may be fluid or pasty in nature and pumpable immediately after processing, but because the solid constituent is in the beta-prime phase they tend to set up or become plastic or solid and non-pumpable during storage at ordinary temperature, and those suspensions containing 40 to 60 per cent solid, for example, quite rapidly become firm solids at temperatures in the range of 90–100° F. Moreover this marked tendency of such suspensions to acquire a non-pumpable plastic or solid state is accelerated by alternate heating and cooling of the suspension within normal atmospheric temperature range such as 70° F. to 100° F. Such initially fluid to pasty suspensions, therefore, may be said to lack stability against marked change in consistency within the aforementioned temperature range. Corresponding fluid to pasty suspensions in fatty oil of solid triglycerides in beta crystalline form, on the other hand, possess greatly improved stability against change to non-pumpable consistency when stored under these temperature conditions.

Before entering into a more detailed description of the invention, it is deemed desirable to point out that the consistency of products prepared in accordance with the present invention has been measured with the aid of an A. S. T. M. type penetrometer employing a cone-shaped aluminum needle having the following characteristics:

Angle, 90°
Maximum diameter, 3.2 cm.
Total weight, 78.3 grams including cone shaft and 50 gram weight.

In actual test the needle is brought to the surface of the sample, released for 5 seconds, and the penetration in tenths of a millimeter is read from a dial indicator. Consistency as measured by this method has been coordinated with viscosity in centipoises and a penetration of 100 corresponds to a viscosity of about 300,000 centipoises. Any material having a penetration as determined above of 100 or more is sufficiently fluid to be pumped with any of the commercially available pumps specifically designed for handling viscous materials, and the term "pumpable" as used herein is to be understood as designating a penetration of not substantially less than 100 and a viscosity of not substantially more than 300,000 centipoises.

Although suspensions of the present invention may be advantageously prepared with the use of pure triglycerides, such as triolein and tristearin, more practical applications involve the use of natural fatty acid esters. As the liquid constituent, for example, any of the naturally occurring liquid glyceride oils such as cottonseed oil, soybean oil, peanut oil, linseed oil, sunflower seed oil, corn oil, olive oil, rapeseed oil, fish oil and the like, mixtures thereof, or normally liquid fractions obtained from these or other glyceride oils, or normally liquid mono- or diglycerides such as monolinolein, monolinolenin, diolein, dilinolein and the like may be employed. In addition other normally liquid fatty acid esters such as sperm oil, methyl oleate, palmityl oleate, benzyl laurate, ethyl laurate, and diethylene glycol monolaurate may be employed. In general the liquid constituent may be any normally liquid oleaginous ester of a mono- or polyhydric alcohol and a saturated or unsaturated fatty acid containing at least 8 and preferably at least 12 carbon atoms in the molecule, and the term "liquid fatty ester" as used hereinafter is to be so construed.

As the solid constituent, completely saturated triglyceride containing major amounts (e. g. not substantially less than 40 per cent) of tristearin and/or tripalmitin and/or other normally solid triglyceride having strong beta-forming tendencies, such as symmetrical palmito distearin for example, and including substantially completely hydrogenated triglyceride fats from the following vegetable and animal oils or their mixtures may be used: sunflower seed oil, linseed oil, hazelnut oil, soybean oil, peanut oil, olive oil, corn oil, and lard. These solid fats may be employed in combination with each other or in major proportion with hydrogenated fats such as cottonseed, palm, tallow, whale, fish and the like which have a lesser tendency to form beta crystals on crystallization. More specifically, mixtures containing major amounts of tristearin or tripalmitin for example, such as a mixture of equal parts substantially completely hydrogenated soybean and cottonseed oils, may be used in products of the invention. Hard fats which have been subjected to molecular rearrangement and hydrogenation processes whereby a major amount of tristearin, tripalmitin or other suitable solid triglyceride is caused to be present in the rearranged product may also be employed.

Within reasonable limits the degree of saturation of the solid constituents of the suspensions of the present invention is not critical, although it is desirable that the iodine value be below 20. Since the beta-forming tendency of solid fat constituents decreases with increase in iodine value, those solid fats having iodine values from 0 to 10 are preferred for use in the manufacture of the suspensions herein covered.

The following test designed to determine the beta-forming characteristics of a fatty material may be employed as a guide in the selection of normally solid triglycerides for use in making pumpable suspensions of the present invention.

Several thin-wall glass capillaries (about 1 mm. outside diameter) are charged with about a centimeter length of the molten fatty ester to be tested. The alpha softening point and the maximum melting point are then determined by methods based on those methods used by Lutton (J. A. C. S., 67, 524 (1945)).

To determine the alpha softening point a sample in its capillary tube is first heated to 100° C. to completely melt the fat and destroy all crystal nuclei, then is chilled for 2 seconds at 0° C. The sample is then thrust into a bath held at a temperature in the range of the expected softening point. The procedure is repeated employing baths at various trial temperatures. On each trial it is noted whether there is or is not increased translucence of the fat sample. The recorded alpha softening point is the average of the lowest temperature where increased translucence is observable and the highest temperature at which it is definitely not observable.

To determine the maximum melting point the sample of fatty ester in its capillary is melted at 100° C., then chilled at 0° C. for 2 to 60 seconds. The sample is then held for 4 hours at 1° to 2° C. below the alpha softening point to effect solid transformation to a higher melting form and for 15 to 20 hours at a temperature 10° C. higher to insure transformation to the highest melting form, then is transferred to a melting point bath and the complete melting point determined at a heating rate of 0.2° C. per minute.

With the data thus obtained the beta-forming characteristics of the fatty material and its suitability for use in making pumpable suspensions may be determined as follows:

One of the capillary samples is melted at 100° C., chilled at 0° C. for 2 to 60 seconds. The sample is stored for 2 hours at 1.5° to 2.5° C. above the average of the alpha softening point and the maximum melting point to effect recrystallization. An X-ray diffraction pattern of the sample is then obtained at room temperature and if this pattern indicates that the sample is 85 per cent or more in the beta crystalline form, the fatty material is suitable for use in producing pumpable suspensions of the present invention.

It is to be understood that throughout the specification and claims the expression of the relative amount of any particular crystalline form in a fatty material is based on the X-ray diffraction pattern of the crystals present.

Products of the present invention may be prepared by cooling during agitation a completely liquid mixture of the normally solid triglyceride and liquid fatty ester to a temperature at which crystallization begins, then controlling the temperature of the mixture so that the solid triglyceride crystallizes in the beta crystalline form as the temperature is reduced to the normal range of room temperature, such as below 100° F. Except in specific cases the temperature at which such crystallization should be permitted to take place cannot be stated positively since it will depend on the proportion and kind of normally solid triglyceride dissolved in the liquid mixture. However, a suitable crystallization temperature for any such liquid mixture will be found to be not substantially lower than the average of the alpha softening point and the maximum melting point of that mixture and these physical characteristics may be determined by the procedures previously described. I have chosen to call this average temperature, or in other words the lowest temperature of crystallization at which beta crystals form in sufficient quantity to yield a product having a pumpable nature as herein defined, the "minimum beta crystallization temperature." In use of the word "minimum" I do not wish to imply that no beta crystals can form at lower temperatures but rather that at such lower temperatures insufficient beta crystals are formed to give the suspensions the substantially permanently pumpable characteristics herein defined. Use of temperatures below the minimum beta crystallization temperature will of course favor the crystallization of the solid triglyceride in the beta-prime or alpha crystalline form, and as previously pointed out such crystalline forms are to be avoided if the optimum is to be realized in pumpable suspensions of the present invention. In practice it is preferable that crystallization be permitted to take place at a temperature from 0° to 2° C. above the minimum beta crystallization temperature and in this connection it is to be noted that the minimum beta crystallization temperature changes with change in composition of the mother liquor, becoming lower as crystallization of solid triglycerides progresses. At any stage in the cooling cycle, therefore, the temperature is maintained not substantially below the minimum beta crystallization temperature of the mother liquor of the system and preferably from 0° to 2° C. above.

The following will serve to illustrate the minimum beta crystallization temperatures for various melted mixtures of 50 parts solid triglyceride and 50 parts liquid triglyceride. It is to be understood, however, that these values may change appreciably with changes in constituents.

| Solid Triglyceride | Liquid Triglyceride | Minimum Beta Crystallization Temp. |
|---|---|---|
| Hydrogenated peanut oil 8 iodine value. | Peanut oil | 56.5° C. |
| Hydrogenated soybean oil 3 iodine value. | Soybean oil | 61° C. |
| Hydrogenated linseed oil 14 iodine value. | Peanut oil | 58° C. |

In order to speed up the formation of crystals and thus reduce the over-all time of the cooling cycle, the melted mixture may be seeded by adding thereto preformed crystals of solid triglyceride or solid triglyceride in powdered form. It is also permissible to supercool the melted mixture and effect the formation therein of a slight cloud of crystalline material. These seeding crystals may be in alpha, beta-prime, or beta form but irrespective of their form, subsequent precipitation of the solid triglyceride will be in the desired beta crystalline form provided the temperature is not substantially below the minimum beta crystallization temperature of the mother liquor. To a large extent those solid crystals which may be present in the beta-prime or alpha crystalline form will be transformed in the solid phase at the beta crystallization temperature so as to have X-ray diffraction patterns characteristic of the beta phase, but even though the X-ray pattern may indicate existence in the beta phase, the outward physical characteristics of the crystals, and their relative stiffening power, tend to remain those of the alpha or beta-prime crystals. Therefore, in the preparation of products of the present invention by the method of cooling a melted mixture of the solid triglyceride and the liquid fatty ester, it is essential that the formation of alpha or beta-prime crystals be held to a minimum both during the initial stages of crystallization and subsequently, tolerances being given more fully below. Such minimum alpha or beta-prime crystal formation may be accomplished by maintaining the temperature of the mix at or slightly above the minimum beta crystallization temperature of the mother liquor throughout the entire cooling cycle as previously pointed out, and if the melted mixture is seeded by supercooling in the initial stages, whereby alpha or beta-prime crystals may be formed, then it is preferable to adjust the temperature of the seeded mix to a temperature at or slightly above the minimum beta crystallization temperature as soon as the seed is formed. For reasons herein indicated it is very desirable that the mixture of solid triglyceride in liquid fatty ester be completely melted in order to destroy all crystal nuclei before beginning the cooling cycle.

The invention will be more clearly understood if examples are given now and before variation in details are discussed. It is to be understood, however, that these examples are merely illustrative of the products of the invention and of methods of producing the same, and that the invention is not limited thereto but rather is defined by the appended claims. Parts are by weight.

Figure 2:
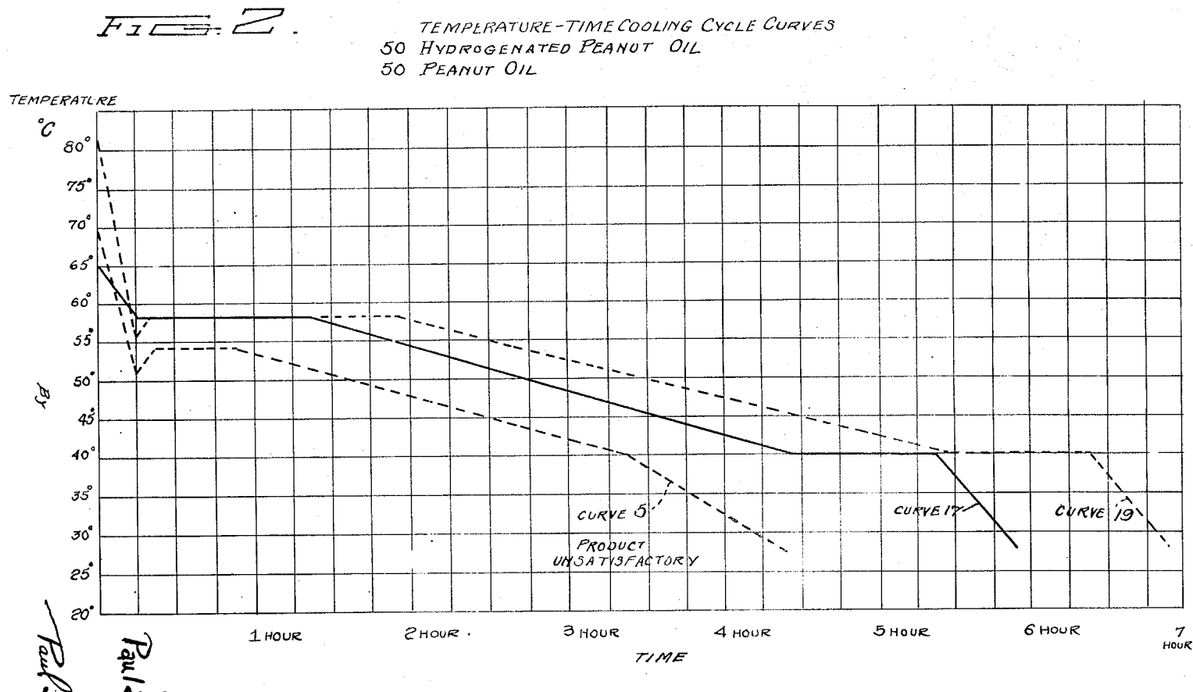
Figure 2 shows time-temperature cooling curves for a mixture of 50 parts substantially completely hydrogenated peanut oil and 50 parts unhydrogenated peanut oil.

*Example 1.*—A mixture of 50 parts hydrogenated peanut oil (8 iodine value) and 50 parts refined and filtered peanut oil (90 iodine value) was mechanically agitated and heated to 65° C. at which temperature the mixture was completely liquid. With the aid of an external water cooling bath (suitable cooling coil arrangement may be employed), the mixture was then cooled to 58° C. (1.5° C. above the minimum beta crystallization temperature of 56.5° C. for this mix) and held at that temperature without substantial variation for one hour and ten minutes to permit crystallization of insoluble high melting triglycerides in the beta phase, mechanical agitation being continued throughout. While still being agitated, the mixture of fat crystals in liquid oil was then uniformly cooled to 40° C. over a period of about 3 hours to cause further crystallization of solid triglycerides in the beta phase, then held at 40° C. for an additional period of about one hour to permit completion of crystallization at this temperature. This cooling cycle was sufficiently slow that the temperature was not substantially below the minimum beta crystallization temperature of the mother liquor at any time. Thereafter the mixture was cooled to a packing temperature of about 26° C. in about 30 minutes. Curve 17 of Figure 2 represents graphically the time-temperature cycle in the processing according to this example.

The product produced was a semi-fluid, pumpable, homogeneous suspension of solid triglyceride crystals in liquid triglyceride, and from X-ray patterns it was judged that over 90% of the solid triglyceride crystals were in the beta crystalline form. This product not only was pumpable as prepared, but also retained a pumpable consistency after storage at 100° F. for several days, penetration at the end of 7 days at 100° F. being 143.

When this same product was heated above its melting point and allowed to cool spontaneously without agitation it set up to a firm non-pumpable mass.

*Example 2.*—A mixture of peanut oil and hydrogenated peanut oil as employed in Example 1 was prepared and heated to 81° C. to melt solid constituents completely. During the following cooling cycle the mixture was mechanically agitated so as to prevent undue crystal growth and interlacing of crystals without substantial incorporation of air. The mixture was first supercooled to 56° C. The temperature was immediately allowed to rise to 58° C. where it was held without substantial variation for one hour and thirty-five minutes, crystallization of solid triglyceride in the beta form being allowed to take place. Thereafter further crystallization was promoted by uniformly cooling the mixture to 40° C. over a period of 3 hours and 30 minutes, thereby maintaining the temperature of the mix not substantially below the minimum beta crystallization temperature of the mother liquor. The mixture was held at 40° C. for one hour to permit completion of crystallization at this temperature, and then cooled to a packing temperature of 28° C. in 30 minutes.

Curve 19 in Fig. 2 depicts graphically the temperature-time cycle. This curve coincides with curve 17 during that interval at which the 58° C. temperature is common to both cycles.

The X-ray pattern of the product produced in accordance with this example indicated that over 90% of the crystallized product was in the beta crystalline form. The suspension was semi-fluid and pumpable as produced, and, although it slowly increased somewhat in viscosity, it retained pumpable characteristics even after storage at 100° F. for several days, the penetration at the end of 7 days being 153.

As in the case of the product prepared in accordance with Example 1, this product, when completely melted and allowed to cool spontaneously without agitation, set up to a firm non-pumpable mass.

Olive oil or diolein may be substituted for the peanut oil as the liquid constituents in Examples 1 and 2 with essentially similar results, the same processing conditions being observed.

In connection with the consideration of curves 17 and 19 of Figure 2, representing the cooling cycles for Examples 1 and 2, attention is directed to curve 5 wherein a product which did not have a stable pumpable consistency was produced from a mixture of the same materials in the same proportions used in Examples 1 and 2. Although this product was pumpable immediately after preparation, it had a penetration value of 90 after storage at 100° F. for one day and after 7 days at 100° F. it was substantially solid, having a penetration of only 6. During the crystallization procedure this mixture was first melted at 70° C., then cooled to about 51° C., then permitted to crystallize at 54° C. for about 30 minutes. It was then cooled to 40° C. over a period of 2½ hours. It is to be noted that the rate of cooling from 54° C. to 40° C. was substantially the same as that used in Examples 1 and 2, but a product with stable pumpable consistency did not result. The essential difference between the two treatments was in the use of a temperature of 54° C. instead of 58° C. to effect crystallization in the early stages. Since 54° C. is below the minimum beta crystallization temperature for this mixture, the solid crystallized in beta-prime crystalline form during the first hour of the cooling cycle, and even though some beta crystals formed during the remainder of the cycle where the cooling rate was substantially that of Examples 1 and 2 the proportion of beta-prime crystals present was such as to impart a non-pumpable consistency to the product after storage at 100° for 7 days.

Figure 3:
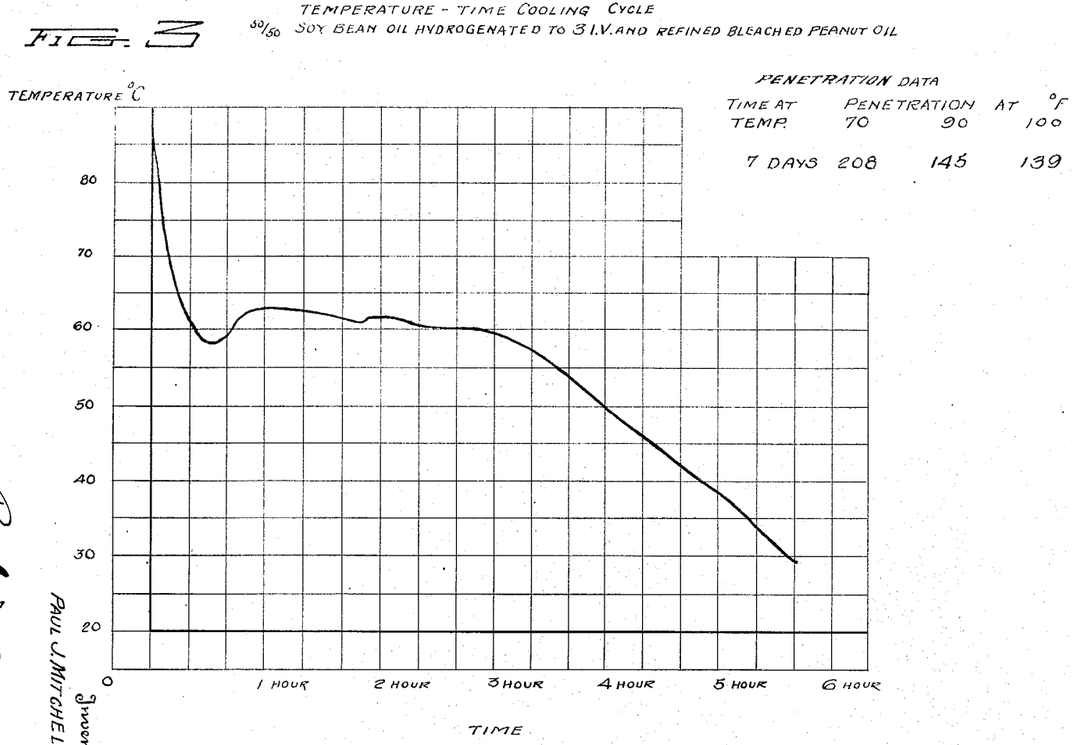
Figure 3 is a time-temperature cooling curve for a mixture of 50 parts of substantially completely hydrogenated soybean oil and 50 parts unhydrogenated peanut oil.
Figure 4:
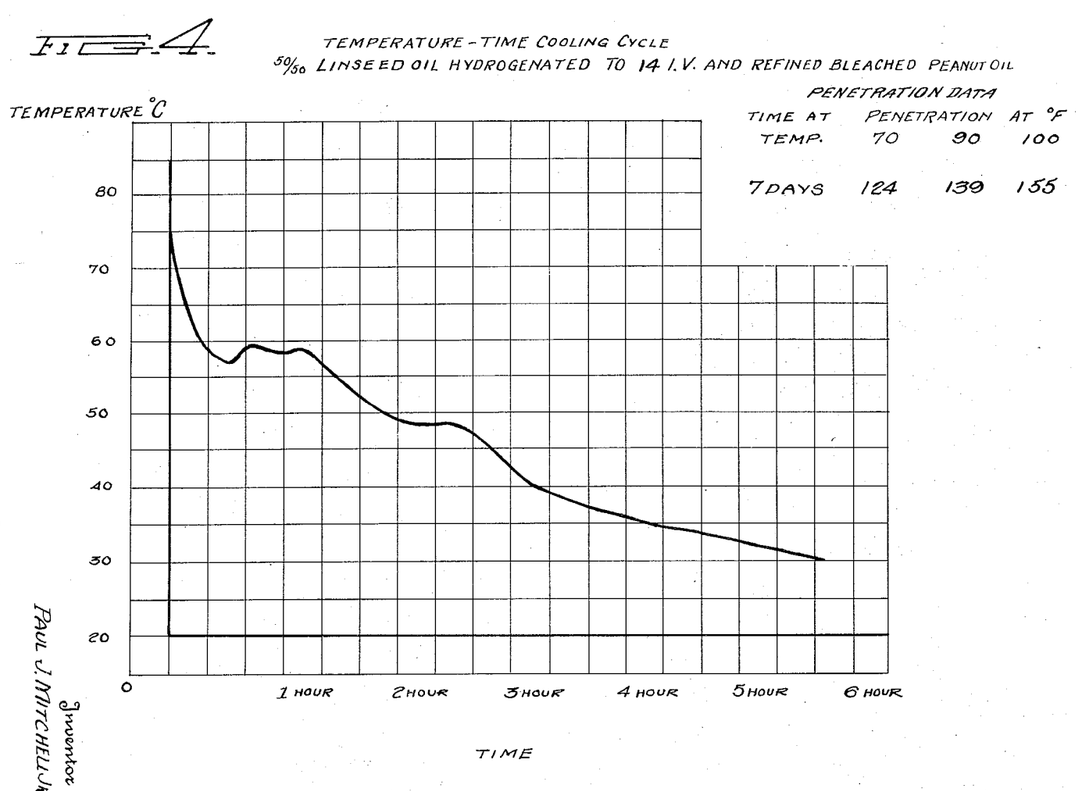
Figure 4 is a time-temperature cooling curve for a mixture of 50 parts substantially completely hydrogenated linseed oil and 50 parts unhydrogenated peanut oil.

In Examples 3 and 4 which follow, products of the present invention are prepared from mixtures other than those set forth in Examples 1 and 2. The cooling cycles are set forth in Figures 3 and 4, respectively.

*Example 3.*—A mixture of 50 parts soybean oil hydrogenated to 3 iodine value and 50 parts refined and filtered peanut oil was heated to 85° C. to effect complete melting and elimination of all crystal nuclei. This melt, which had a minimum beta crystallization temperature of about 61° C., was then rapidly cooled to 58° C. over a period of about 30 minutes. Crystallization of the solid triglycerides began, and the temperature was allowed to rise to about 63° C. in about 30 minutes, after which the temperature was gradually reduced to 58° C. over a period of about 2 hours and 20 minutes. Throughout this period normally solid triglycerides in the beta crystalline form precipitated. Thereafter the temperature was reduced at a substantially uniform rate to the pack-out temperature of 28° C. over a period of about 2 hours and 20 minutes. Throughout the above procedure the triglyceride mixture was agitated mechanically to avoid interlacing of crystals during crystal growth, care being taken to avoid substantial incorporation of air in the product.

As thus prepared, the product was pumpable and it retained a pumpable consistency even after storage at 100° F. for 7 days, as indicated by a penetration value of 139.

An X-ray analysis indicated that the solid fat content of the mixture was 100% in the beta crystalline form.

A corresponding mixture of triglycerides when spontaneously cooled from melted condition to room temperature without agitation set up to a non-pumpable mass.

Since substantially completely hydrogenated soybean oil crystallizes in the beta form more readily than substantially completely hydrogenated peanut oil for example, less accurate control of crystallization temperature is required in the case of hydrogenated soybean oil to produce the pumpable suspensions of my invention.

Refined and filtered soybean oil or cottonseed oil may be substituted for the peanut oil as the liquid constituent in this example with essentially similar results.

*Example 4.*—A mixture of 50 parts hydrogenated linseed oil of iodine value 14 and 50 parts of refined and filtered peanut oil was heated to 72° C. at which temperature the mixture was completely melted and all crystal nuclei were destroyed. This mixture had a minimum beta crystallization temperature of about 58° C. The temperature of the melted mixture was then reduced to about 56.5° C. in about 35 minutes. Crystallization began, the heat involved in such crystallization being allowed to raise the temperature to about 59° C. After about 25 minutes at this temperature, during which the solid triglycerides crystallized in the beta crystalline form, the temperature was gradually reduced to a pack-out temperature of 30° C. over a period of about 4 hours and 30 minutes, the temperature remaining constant at about 48.5° C. for a period of about 20 minutes, due to slow extraction of heat of crystallization.

The entire cooling cycle required about 5 hours and 40 minutes.

As in the case of previously described examples, the mixture was mechanically agitated throughout the cooling cycle, the degree of agitation being such as to prevent substantial interlacing of crystals during crystal growth but insufficient to cause substantial incorporation of air in the mix.

The X-ray diffraction pattern on the finished product indicated that more than 90% of the solid triglyceride was in the beta crystalline form. The product was also pumpable as prepared and it retained a pumpable consistency after 7 days storage at 100° F., as indicated by a penetration value of 155 after such storage.

A corresponding mixture of triglycerides when spontaneously cooled from melted condition to room temperature without agitation set up to a non-pumpable mass.

Corn oil or sperm oil may be substituted for the peanut oil as the liquid constituent in the above example, the mixture being processed in substantially the same way to give essentially similar results.

Practice of the invention is not limited to the specific conditions set forth in the above examples and may be varied over a wide range, as indicated by the following discussion.

According to the results of a detailed study of the products of my invention, it is preferable that at least about 85 per cent of the solid triglycerides of the suspension, as judged by the relative intensities of short spacing lines in X-ray diffraction pattern, exist in the beta phase, and in addition have the outward physical characteristics of beta crystals. Such high beta content is especially desirable in the preparation of pumpable compositions containing 50 to 60 per cent normally solid triglycerides. When compositions containing lower proportions of solid triglyceride such as 25 to 30 per cent are contemplated, the content of beta crystals may be somewhat lower, but preferably at least about 70 per cent.

In the examples, pumpable suspensions were prepared from mixtures of 50 parts normally solid triglyceride and 50 parts normally liquid triglyceride. Even greater proportions of solid triglyceride may be employed, and I have found that pumpable suspensions containing as much as 60 per cent solid triglyceride in 40 per cent liquid fatty ester may be prepared. Although the present invention may be most advantageously applied in the preparation of pumpable suspensions in which the concentration of the normally solid triglyceride is from 25 to 60 per cent, the invention may be applied also in the preparation of pumpable suspensions containing the normally solid triglyceride in lower proportion, such as 15 per cent. In this connection it is to be noted that as heretofore prepared suspensions containing only 15 per cent solid triglyceride may be non-pumpable if the solid triglyceride exists in the beta-prime phase or if the space distribution of the solid corresponds to the physical characteristics of the beta-prime crystals.

When products of the present invention are prepared by cooling a mixture of the normally solid triglyceride and normally liquid fatty ester, the mixture should be agitated during the period in which crystallization takes place. Although mechanical agitation is preferred because of ease of control, other means of agitation including circulation induced by pump pressure may be employed.

Such agitation insures uniform cooling of the triglyceride mixture and, during the period of crystallization, especially minimizes the formation of highly branched crystal clusters whereby interlacing of individual crystals and occlusion and immobilization of mother liquor may result with accompanying stiffening of the suspension. For production of substantially permanently pumpable suspensions in which solid remains uniformly distributed throughout the mother liquor it is desirable that the solid triglyceride be present in particulate form as separate crystals or as compact crystal clusters rather than as open and highly branched clusters. The degree of agitation necessary to accomplish this end is not critical, but it is usually preferable to avoid vigorous agitation such as would incorporate a substantial amount of air in the suspension, or fracture individual crystals thereby producing a suspension of solid in extremely fine form, both of which conditions may ultimately result in an undesirable firming of the product.

In the event crystallization of the solid triglyceride in the beta phase is conducted under conditions whereby clusters of crystals result, the suspensions may be improved by breaking the clusters into smaller particle form and redistributing the solid in the mother liquor. Although simple mechanical agitation may sometimes suffice to effect this reduction in particle size, it is preferable to pass the suspension through a wet grinding mill which accomplishes the desired end in a more positive and efficient manner.

While I have referred to the suspensions of the present invention as having substantially permanent pumpability over the normal range of room temperature such as 70–100° F., it is to be borne in mind that at the higher temperatures in this range the suspended solids, especially those particles of very small size, tend to redissolve in the mother liquor and crystallize on existing suspended solids, and thereby tend to form clusters of interlaced crystals which may immobilize mother liquor and cause increase in viscosity of the product. This tendency toward increase in viscosity is comparatively slight when the suspended solid triglyceride is in the beta phase and thus in the case of the products of the present invention it does not interfere with their use under normal conditions of commercial practices because storage or use at or near 100° F. for prolonged periods exceeding several weeks is not customarily encountered.

Although the technique employed in the examples given above, particularly with respect to agitation, yields suspensions in which very little air has been incorporated, nevertheless it has been noted that amounts of air as high as 15 per cent in the finished product are not seriously harmful. The incorporation of gases such as air tends to make the product less fluid and less easily pumped, but the presence of some air or other gas such as nitrogen or carbon dioxide in the product, although having no effect on the permanency of pumpable consistency, does have the advantage of rendering the product more stable with regard to changes in pumpable consistency with variations in temperature in the ordinary range of room temperature, and of giving the product a whiter appearance. However, a governing factor relative to incorporation of gases, aside from the tendency of the gases to stiffen the oleaginous product, is the ultimate use to which the product is to be put and it is to be borne in mind that any free oxygen may tend to cause rancidity or off-flavor where unsaturated and oxidizable materials are present.

If desired, the suspension of the present invention may be modified by the addition of insoluble non-fatty-ester solid or liquid materials to provide special effects. For example, the viscosity of the suspension at ordinary temperature is such as to make it an ideal carrier for vitamins, salt, sugar, malt, and other flavoring ingredients. Such added materials may be incorporated in the suspension and the incorporation may be effected during the crystallization cycle if desired as Example 5 below indicates.

*Example 5.*—1000 g. of a mixture of 33% of hydrogenated peanut oil (iodine value 10) and 67% of non-hydrogenated peanut oil (iodine value 90), is heated to melt it (58°–61° C.) in a mechanical mixer of 3000 cc. capacity, then cooled to 50–55° C. with the aid of a water bath. At 50–55° C. the oleaginous mixture is agitated by stirring slowly, while cooling is permitted to take place. The temperature of the mass will drop to 48° to 50° C. The water bath is adjusted so that the temperature of the oleaginous mixture does not drop below 48° C. Agitation is slowly continued until all latent heat is given off.

During this period of heat dissipation the temperature will rise to 53° to 55° C. as minute, solid particles form in the liquid phase. After reaching 55° C. the temperature of the mass will steadily drop to 48° C. During this period slow agitation is maintained. The mass is cooled further anad when the temperature reaches substantially 40° C. at which point the viscosity is sufficient to suspend salt, 15 parts of salt (sodium chloride) are added per 100 parts of the hydrogenated constituent. When the temperature of the mass reaches 35° C. the bath may be set at room temperature (25° C.). Agitation is continued throughout until room temperature is reached.

The product thus prepared was pumpable and had reasonably good resistance against change to non-pumpable consistency but had greater tendency to develop a firmer consistency at 100° F. than did the products of the previous examples.

Since the crystallization of the hydrogenated oil in the initial stages occurred below the minimum beta crystallization temperature, the crystals thus formed were in a phase other than the beta phase. As the temperature rose these crystals were converted by solid phase transformation to the beta form.

Products containing suspended salt as the flavoring agent are especially suitable for use in the manufacture of peanut butter to prevent oil separation during storage of the butter. For such use suspensions comprising as the oleaginous constituent a mixture of substantially completely hydrogenated peanut oil and refined and filtered peanut oil, which mixture has an iodine value in the range of 42-66, are of particular value and specifically a suspension prepared from one part hydrogenated peanut oil of 8 iodine value, one part refined and filtered peanut oil, and one part sodium chloride has been found to possess outstanding merit.

Because of the pumpable nature of the oleaginous product of the present invention, it lends itself readily to use in cooking fat compositions, more particularly in industrial channels where its flowable and pumpable condition is found to be advantageous.

In the field of medicine, more particularly in topical medicine, serving as a carrier for other constituents such as in liniments or ointments, the permanently fluid to pasty nature of the products of the present invention may be utilized. Also the products may be employed in the cosmetic field where a component or carrier of fluid to pasty nature aand pumpable consistency is desired, such as in skin creams.

Ease of handling is an outstanding advantage in any compounding operations, whether in food manufacturing plants or in non-edible outlets. Because the products of the present invention are pumpable at normal room temperatures, they are both easily removed from containers and easily mixed with additional ingredients such as other liquids or subdivided solid matter without the application of heat.

This application is a continuation-in-part of my pending application Serial No. 642,097, filed January 18, 1946, now abandoned. Since the filing of this parent case the invention has been explored further with resulting better understanding of the theoretical factors involved.

Having thus described my invention, what I claim and desire to secure by Letters Patent is:

1. An oleaginous composition comprising essentially a uniform suspension of normally solid fatty acid triglyceride in particulate form in normally liquid ester of fatty acid containing at least 8 carbon atoms in the molecule, said solid triglyceride being at least 70% in beta crystalline form and constituting more than 15% but not more than 60% by weight of the fatty constituents, the crystals being in substantially non-interlacing relationship, said composition having, throughout the temperature range of 70° to 100° F., (1) a flowable and pumpable consistency, (2) a viscosity of not more than 300,000 centipoises, and (3) a penetration of at least 100, and being capable of retaining such properties during storage within said temperature range for a period of at least seven days.

2. A process for producing an edible fat product which comprises agitating a substantially liquid mixture of normally solid fatty acid triglyceride with normally liquid ester of fatty acid containing at least 8 carbon atoms in the molecule, said solid triglyceride constituting more than 15% but not more than 60% by weight of the fatty constituents, at a temperature not below and not more than 2° C. above the minimum beta crystallization temperature of the mother liquor, to form in the liquid ester discrete particles of solid triglyceride of which at least 70% are in the beta crystalline form, the degree of agitation being sufficient to prevent substantial interlacing of beta crystals, whereby the product is flowable and pumpable at temperatures between 70° and 100° F.

3. A process for preparing a substantially uniform suspension of normally solid fatty acid triglyceride in normally liquid ester of fatty acid containing at least 8 carbon atoms in the molecule, said normally solid triglyceride constituting more than 15% but not more than 60% by weight of the fatty constituents, which comprises the steps of cooling a substantially liquid mixture of said normally solid triglyceride and said normally liquid ester through a temperature range within which crystallization of the normally solid triglyceride occurs, to a temperature below 100° F., and agitating the mixture while crystallization of the normally solid triglyceride takes place at a temperature not below the minimum beta crystallization temperature of the mother liquor to effect crystallization of at least about 70° of the normally solid triglyceride in the beta phase, and to produce a product which is uniform, stable, flowable and pumpable throughout the temperature range of 70° to 100° F.

4. The product of claim 1 wherein the iodine value of the normally solid triglyceride is below about 20.

5. The product of claim 1 wherein at least about 85% of the normally solid triglyceride is in the beta crystalline form.

6. The product of claim 1 wherein the normally solid triglyceride constitutes at least 25% by weight of the fatty constituents.

7. The product of claim 1 wherein the product has the characteristic of setting up to a non-flowable, non-pumpable consistency when melted and allowed to spontaneously cool without agitation to a temperature of 70 to 100° F.

8. The product of claim 1 wherein the normally solid triglyceride is hydrogenated peanut oil.

9. The product of claim 1 wherein the normally solid triglyceride is hydrogenated soybean oil.

10. The process of preparing a uniform pumpable suspension of finely divided high melting normally solid triglyceride in liquid fatty esters, the said solid being capable of existence in the beta crystalline form, which comprises the steps of forming at any stage said solid triglyceride in finely divided crystalline form whose phase is other than beta phase and thereafter converting at least 70% of said solid triglyceride by solid phase transformation to the beta crystalline phase, and agitating the crystals with the fatty esters to disperse the crystals as discrete particles, the said triglycerides comprising 15 to 60% by weight of the suspension and recovering the flowable and pumpable suspension thus formed at a temperature below 100° F.

11. The process of claim 10 further characterized by mechanically disintegrating the triglyceride crystals.

PAUL J. MITCHELL, JR.

REFERENCES CITED

The following references are of record in the file of this patent:

UNITED STATES PATENTS

| Number | Name | Date |
|---|---|---|
| 1,395,934 | Stockton | Nov. 1, 1921 |
| 1,911,222 | Bollens et al. | May 30, 1933 |
| 2,442,532 | Eckey | June 1, 1948 |